Figure 1:
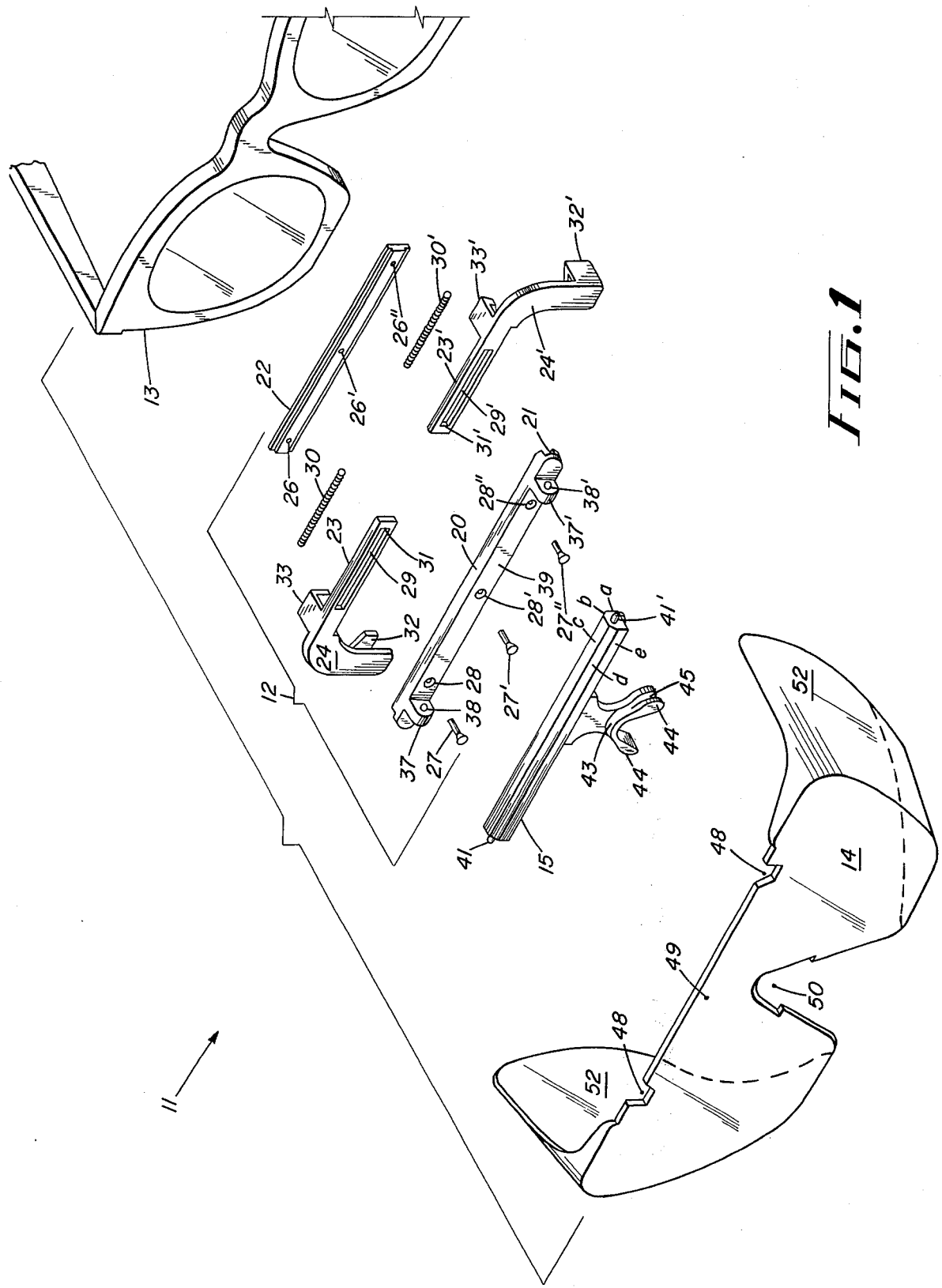

United States Patent [19]
Bienenfeld

[11] 3,901,589
[45] Aug. 26, 1975

[54] CLIP-ON FLIP-UP GOGGLES

[75] Inventor: Harold Bienenfeld, Roslyn Harbor, N.Y.

[73] Assignee: American Cyanamid Company, Stamford, Conn.

[22] Filed: July 8, 1974

[21] Appl. No.: 486,533

[52] U.S. Cl. .......................... 351/47; 2/13; 2/14 XS
[51] Int. Cl.² ...................... G02C 9/02; G02C 9/04
[58] Field of Search .......... 351/47, 48, 57, 58; 2/13, 2/14 XS

[56] References Cited
UNITED STATES PATENTS

| | | |
|---|---|---|
| 2,679,191 | 5/1954 | Tomlin ........................... 2/14 XS X |
| 2,926,563 | 3/1960 | Lockwood ........................... 351/48 |
| 2,949,609 | 8/1960 | Sager ............................... 351/48 X |

Primary Examiner—Paul A. Sacher
Attorney, Agent, or Firm—Philip Mintz

[57] ABSTRACT

Clip-on flip-up goggles of novel construction are provided wherein a simply constructed inexpensive shield holder and clipping means permit manual adjustment of the shield to any one of five positions for use or storage out of use while still secured to the frame of a pair of spectacles. Also, a simple shield holder is provided for detachably securing the shield so it can be easily interchanged with other shields. Also, an easily fabricated and assembled clipping means is provided.

4 Claims, 2 Drawing Figures

3,901,589

CLIP-ON FLIP-UP GOGGLES

This invention relates to improved goggles adapted to be detachably clipped to the spectacles of a wearer. More particularly, it relates to such goggles which, while attached to the spectacle frame, may be manually flipped down to a position overlying the spectacle lenses and flipped up out of the direct line of vision to a plurality of other positions.

In accordance with the present invention, there is provided clip-on flip-up goggles comprising generally, a clipping means for detachably securing the goggles to the frame of a pair of spectacles, a shield having a transparent substantially flat front portion, and a shield holder which serves both to support the shield in a fixed position relative to the shield holder and to mount same to the clipping means so the shield can be manually rotated to any one of five selected positions wherein it will stay until manually rotated to another position. The shield holder and the clipping means are provided with means for securing them together so that the shield holder can rotate relative to the clipping means about an axis of rotation. The shield holder is provided with five planar surfaces, each equidistant from the axis of rotation, each of which intersects the adjacent planar surfaces at an angle of about 135° forming ridges therebetween. All of the ridges are also equidistant from the axis of rotation and further therefrom than the planar surfaces. The clipping means is provided with a surface thereon which is a greater distance from the axis of rotation than the planar surfaces but a lesser distance therefrom than the ridges. Thus, the shield holder tends to remain with a planar surface facing the surface on the clipping means except when force is used to rotate the shield holder past a ridge position.

The clipping means is also provided with clips to detachably secure the goggles to the frame of a pair of spectacles. A preferred embodiment of this clipping means is one wherein two clip mounts are provided which slide in a rectangular opening extending through the clipping means against the action of means, such as springs, resiliently biasing them towards each other.

In a preferred embodiment, the shield is detachably mounted in the shield holder so that shields can be interchanged whenever desired. The mounting includes a depending nose piece having slotted elastically bendable wings shaped to conform with a cut-out nose portion of the shield and a slot in the shield holder into which fits a straight upper edge portion of the shield.

The shield may be provided with side protector portions configurated to overlie the space between the flat front portion of the shield and the head of the wearer to protect the eyes from the side. The shield may be of colorless transparent material where eye protection is sought against physical materials or it may be suitably tinted to also protect the eyes against incident radiation. Thus, these goggles are useful for people performing operations, such as welding, grinding, chipping, drilling, etc. as well as persons exposed to lasers, sunlight, ultraviolet radiation, etc. These goggles are especially useful for wear at beaches where the eyes are protected from sunlight, blowing sand, and splashing water.

Figure 2:
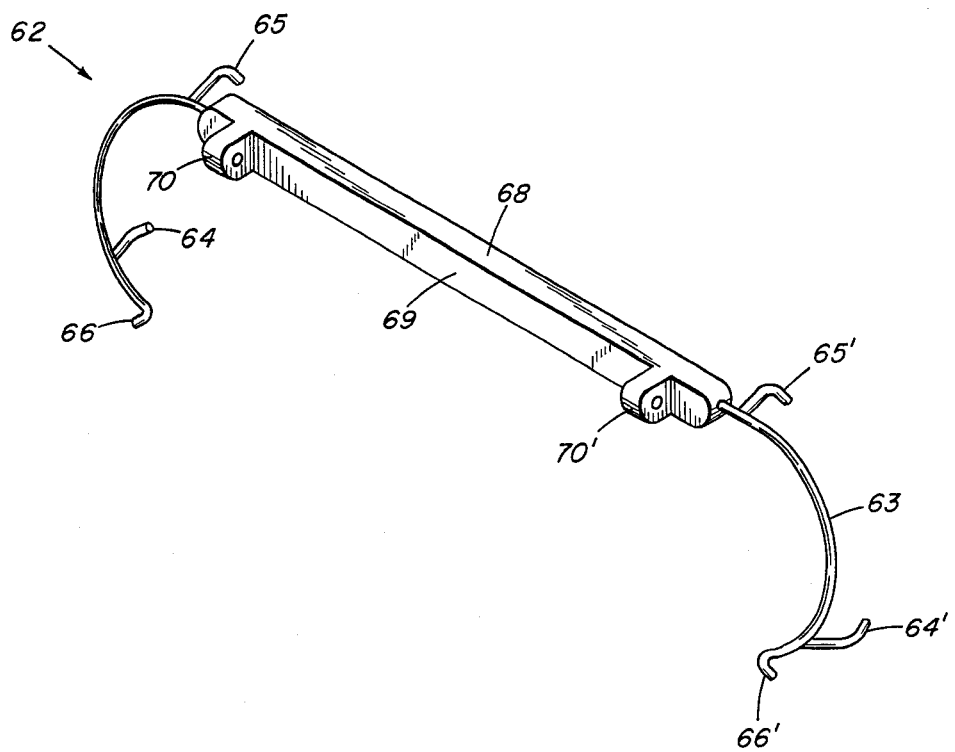

For a clearer and more detailed understanding of the present invention and the advantages thereof, reference should be made to the following description in conjunction with the accompanying drawings wherein FIG. 1 is an exploded view of a preferred embodiment; and FIG. 2 is a perspective view of an alternative embodiment of a portion thereof.

The clip-on flip-up safety goggles 11 seen in the exploded view of FIG. 1 generally consists of a clipping means 12 adapted to removably secure the safety goggles to the frame of a pair of spectacles 13, a shield 14, and a shield holder 15 to adjustably secure shield 14 to clipping means 12.

Clipping means 12 comprises bridge 20 provided with rectangular slot 21 extending the full length thereof on the side facing the wearer which slot 21, when covered by cover plate 22, provides a rectangular opening in bridge 20 wherein the slide portions 23, 23' of clip mounts 24, 24' slidably fit. Cover plate 22 is provided with three holes 26, 26', 26'' which receive screws or rivets 27, 27', 27'' which pass through holes 28, 28', 28'' in bridge 20 to secure the cover plate 22 over rectangular slot 21 in bridge 20. Slide portion 23 of clip mount 24 is provided with rectangular opening 29 which is of sufficient size for spring 30 to fit therein with one end of spring 30 pressing against end 31 of opening 29 and with the other end pressing against rivet 27 passing through opening 29 between hole 28 and hole 26. Similarly, slide portion 23' of clip mount 24' is provided with rectangular opening 29' for spring 30' to fit between end 31' thereof and rivet 27'' passing therethrough. Thus, clip mounts 24, 24' are slidable away from each other against the pressure of springs 30, 30' tending to bias them towards each other. Clip mounts 24, 24' are each provided with clips 32, 32', 33, 33' which can be slipped over the frame of a pair of spectacles 13 when manually extended and which grip the frame of spectacles 13 when released to permit clip mounts 24, 24' to slide towards each other.

On the side of bridge 20 opposite to the side wherein slot 21 is provided two shield holder mounts 37, 37' are provided, each of which has a hole 38, 38' passing therethrough, for adjustably supporting shield holder 15. Shield holder 15, which is slightly shorter than the distance between mounts 37, 37', is provided at each end with a projection 41, 41' of appropriate size to rotatably fit within holes 38, 38'. It will be noted that shield holder 15 is provided with five planar surfaces a, b, c, d, and e extending lengthwise from one end thereof to the other, each of which is at an angle of about 135° to the next adjacent planar surface whereby ridges also extend lengthwise along shield holder 15 between each adjacent pair of planar surfaces. Projections 41, 41' are each located so as to be equidistant from each of the five planar surfaces a, b, c, d, and e and also equidistant from the four ridges between the adjacent pairs of planar surfaces. Holes 38, 38' in shield holder mounts 37, 37' are located so their center line is spaced from the flat surface 39 or the top surface of screws or rivets 27, 27', and 27'' by a distance which is greater than the distance between the center line of projections 41, 41' and planar surfaces a, b, c, d, and e but which is less than the distance between the center line of projections 41, 41' and the crests of the ridges between such planar surfaces. This, then, provides for the shield holder 15 to be rotatable over an arc of about 180° and to have five stable rest positions, one about every 45°, wherein planar surfaces a, b, c, d, or e, respectively, face a surface on clipping means 12 which is either flat surface 39 or the top surface of screws or rivets 27, 27', and 27''.

Shield holder 15 is provided with nose piece 43 secured to the center of one side thereof, opposite planar surface c and between planar surfaces a and e. The side of shield holder 15 to which nose piece 43 is secured is also provided with a slot, not shown, which extends nearly, but not quite, the entire length of shield holder 15. Nose piece 43 is provided with a pair of elastically bendable wings 44, each of which has a slot 45 in the outer surface thereof. Shield 14, which is of transparent material which may be clear or colored, is provided with two notches 48 spaced the appropriate distance apart so the portion 49 between notches 48 will just fit within the slot, not shown, extending the length of shield holder 15. Shield 14 is also provided with a cut out portion 50 configurated to slide within slots 45 of nose piece 43 when wings 44 are pressed towards each other and to be securely held by slots 45 when wings 44 are released. Thus, shield 14 can easily be removed and replaced wherever desired, as for changing color or depth or color of shield 14, etc. Slots 48 in shield 14 are each sufficiently wide and deep to extend over the end of shield holder 15 and over shield holder mounts 37, 37' without contacting the mounts 37, 37'. Shield 14 is provided with side protector portions 52, 52' to protect the eyes from the sides, which side portions are appropriately shaped to encompass the wearer's eye sockets.

It will thus be seen that, when clipped on a pair of spectacles 13, these clip-on flip-up safety goggles 11 can be worn in any one of five distinct positions with the wearer easily able to adjust goggles 11 to any position without removal of goggles or spectacles from the head. In the first position, wherein planar surface a faces the surface of clipping means 12, the shield 14 extends substantially vertically in front of the pair of spectacles 13 with nose piece 43 near the wearer's nose to provide maximum frontal and lateral protection to the eyes. In the second position, wherein planar surface b faces the surface of clipping means 12, the face of shield 14 is partially raised to an angle of about 45° to the plane of the front of spectacles 13 whereby the wearer can look through the lower portions of the spectacle lenses without obstruction by shield 14 although substantial protection is provided against light or material coming from above and in front. This position might be used with a colored (sun-glass) shield for reading in bright sunlight where the reading matter is shadowed. In the third position, wherein the planar surface c faces the surface of clipping means 12, the face of shield 14 is raised to about perpendicular to the plane of the front of spectacles 13 whereby the wearer can look through most of the spectacle lenses without obstruction by shield 14 although shield 14 still serves to shadow the eyes from light coming from above or the sides. In the fifth position, wherein the planar surface e faces the surface of clipping means 12, the shield 14 is completely raised to extend substantially vertically upwardly from the upper portion of spectacles 13 in front of the wearer's forehead permitting retaining the safety goggles 11 mounted on spectacles 13 when not in use. In the fourth position, wherein the planar surface d faces the surface of clipping means 12, the shield 14 is almost completely raised to an angle about 135° to the plane of the front of spectacles 13 whereby the safety goggles 11 can be maintained mounted on spectacles 13 when not in use even if the wearer is also wearing a safety helmet, hard hat, or other head covering having a forwardly-extending brim.

An alternative embodiment of clipping means 62 (which may be used in place of clipping means 12), illustrated in FIG. 2 comprises a springy wire 63 shaped to conform to the outline of a pair of spectacles provided with clips 64, 64', 65, 65' positioned to secure the structure to the frame of a pair of spectacles and to be attachable or removable by spreading ends 66, 66' apart manually to permit slipping over the spectacle frame. The central portion, not shown, of springy wire 63 is flattened and embedded in bridge 68 which is provided with a flat surface 69 and mounts 70, 70' identically as previously described for bridge 20.

While the clip-on flip-up safety goggles of the present invention have been illustrated and described in terms of certain specific embodiments, it is to be understood that the invention is not limited to such details except insofar as they appear in the subjoined claims.

What is claimed is:

1. Clip-on flip-up goggles comprising, in combination:
   a. a shield having a transparent substantially flat front portion;
   b. a shield holder for supporting said shield in a fixed position relative thereto; and
   c. clipping means provided with means for detachably securing same to the frame of a pair of spectacles;
   d. means for securing said shield holder to said clipping means so said shield holder is rotatable relative to said clipping means about an axis of rotation parallel to said front portion of said shield; and
   e. means for retaining said shield holder in any one of five selected positions while permitting manual change of position wherever desired, said means comprising five planar surfaces extending lengthwise along said clipping means parallel to said axis of rotation, each equidistant therefrom, each of said planar surfaces intersecting the adjacent planar surfaces at an angle of about 135° to form ridges therebetween, each of said ridges being equidistant from said axis of rotation, each of said ridges being a distance from said axis of rotation greater than the distance of said planar surfaces from said axis of rotation, said means also comprising a surface on said clipping means located a distance from said axis of rotation intermediate the distances of said ridges and of said planar surfaces from said axis of rotation.

2. Clip-on flip-up goggles as defined in claim 1 wherein said shield has a straight upper edge portion and a cut-out nose portion and said shield holder has a slot into which said upper edge portion fits and a depending nose piece having slotted elastically bendable wings to removably secure said shield to said shield holder by engaging the shield at said cut-out nose portion.

3. Clip-on flip-up goggles as defined in claim 1 wherein said clipping means includes a bridge portion provided with a slot extending the full length thereof; a cover for said slot providing, in combination with said slot, a rectangular opening through the full length of said bridge portion; a pair of clip mounts each having one end thereof configurated to slide within said rectangular opening and each having the other end provided with clips to detachably secure said goggles to the frame of a pair of spectacles; and means for resiliently urging said clip mounts to slide towards each other in said rectangular opening.

4. Clip-on flip-up goggles as defined in claim 1 wherein said shield is provided with side protector portions configurated to overlie the space between said front portion thereof and the head of the wearer thereof.

* * * * *